United States Patent [19]

Hosokoshi et al.

[11] 4,059,834

[45] Nov. 22, 1977

[54] LIGHT EXPOSING APPARATUS FOR FORMING A PHOSPHOR SCREEN OF A CATHODE RAY TUBE

[75] Inventors: Kakuichiro Hosokoshi, Neyagawa; Hikoshi Yamamoto; Masayuki Tanaka, both of Takatsuki; Shinichi Omura, Nagaokakyo, all of Japan

[73] Assignee: Matsushita Electronics Corporation, Osaka, Japan

[21] Appl. No.: 556,876

[22] Filed: Mar. 10, 1975

[30] Foreign Application Priority Data

Mar. 13, 1974 Japan ................................ 49-29372
Mar. 13, 1974 Japan ................................ 49-29373

[51] Int. Cl.$^2$ ............................................ G03B 41/00

[52] U.S. Cl. ........................................ 354/1; 96/36.1

[58] Field of Search ................ 354/1; 355/68; 96/36.1

[56] References Cited

U.S. PATENT DOCUMENTS

| | | | |
|---|---|---|---|
| 3,559,546 | 2/1971 | McKee | 354/1 |
| 3,636,836 | 1/1972 | Maddox et al. | 354/1 |
| 3,736,848 | 6/1973 | Lsuneta et al. | 354/1 |
| 3,780,629 | 12/1973 | Barten et al. | 354/1 |
| 3,848,983 | 11/1974 | Fridrich | 354/1 |
| 3,856,525 | 12/1974 | Inoue | 354/1 X |
| 3,890,151 | 6/1975 | Seizuki et al. | 354/1 X |
| 3,906,515 | 9/1975 | Hosokoshi et al. | 354/1 |
| 3,925,700 | 12/1975 | Saito | 354/1 |
| 3,949,411 | 4/1976 | Yonai | 354/1 |

*Primary Examiner*—Edna M. O'Connor
*Attorney, Agent, or Firm*—Stevens, Davis, Miller & Mosher

[57] ABSTRACT

A light exposing apparatus for use in forming a phosphor screen of a color cathode ray tube is disclosed in which a control means is connected to a movable platform for relatively moving a light sensitive film mounted on an inner surface of a face panel relative to an exposing light source facing said light sensitive film with a shadow mask interleaved therebetween. An electrical signal is supplied to said control means each time the accumulated value of ultraviolet ray emitted from said light source reaches a predetermined value, and said movable platform is moved lengthwise of slots in said shadow mask depending on the magnitude of said electrical signal during the light exposing process.

4 Claims, 7 Drawing Figures

LIGHT EXPOSING APPARATUS FOR FORMING A PHOSPHOR SCREEN OF A CATHODE RAY TUBE

The present invention relates to a light exposing apparatus for selectively exposing a light sensitive film including phosphor particles or polyvinyl alcohol (PVA) in order to form a number of phosphor strips or PVA cured film strips after having mounted said light sensitive film on an inner surface of a face panel.

In a color cathode ray tube having a slotted shadow mask, it is advantageous in enhancing the brightness of the cathode ray tube to design the dimension of the phosphor strips such that the length thereof is greater than the major diameter of slots in the shadow mask.

Such elongated phospher strips may be formed by moving an exposing light source along the direction of the major diameter of the slots during a certain time period in the light exposing process. However, when such movement is conducted at a constant velocity the variation in the intensity of the light source would directly appear as an uneven distribution of the amount of light exposure. Further, since it is not possible to accurately control the ratio of the amount of light exposure when of the light source is stopped and during the movement thereof, there is no assurance that phosphor strips having the desired shape and size can always be formed with high accuracy.

In accordance with the present invention, there is provided a light exposing apparatus for forming a phosphor screen of a cathode ray tube characterized in that a control means is connected to a movable platform for relatively moving a light sensitive film mounted on an inner surface of a face panel relative to an exposing light source facing said light sensitive film with a shadow mask interleaved there-between. An electrical signal is supplied to said control means each time the accumulated value of ultraviolet ray emitted from said light source reaches a predetermined value, and said movable platform is moved lengthwise of slots in said shadow mask depending on the magnitude of said electrical signal during the light exposing process.

With the light exposing apparatus of the present invention, since the relative movement of the light sensitive film evenly applied on the inner surface of the face panel relative to the exposing light source is automatically changed depending on the change in the intensity of the exposing light source, the distribution of the amount of light exposure in the exposing areas of the light sensitive film can be always maintained at a predetermined level and it can even be adjustable. Further, it is also possible to establish any desired ratio of the amounts of light exposure at the stop and the movement of the exposing light source.

Figure 1:
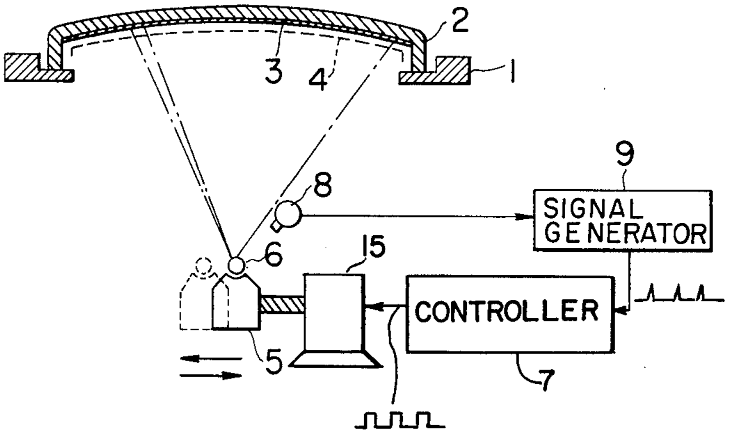
Figure 2:
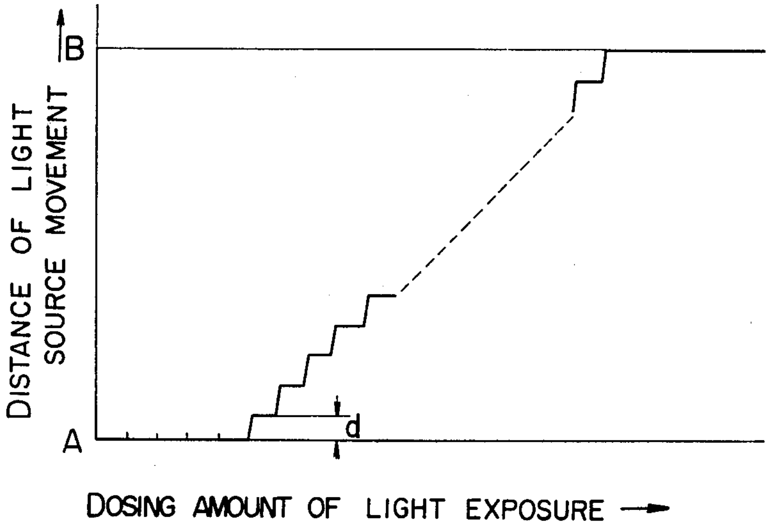
Figure 3:
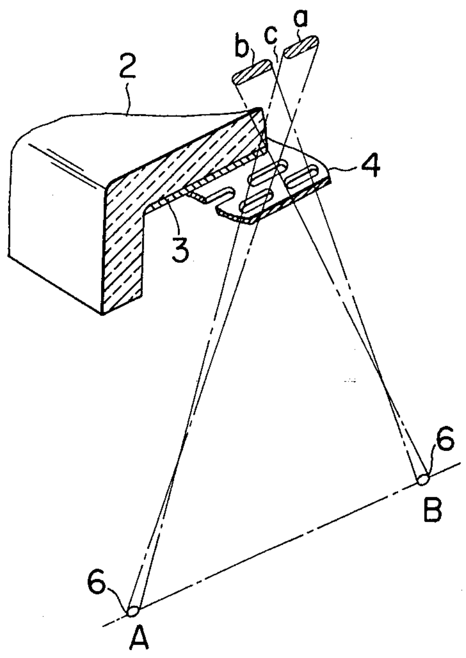
Figure 4:
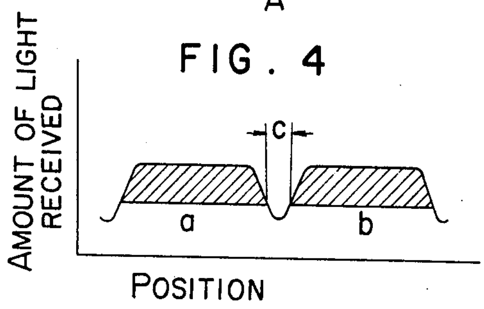
Figure 5:
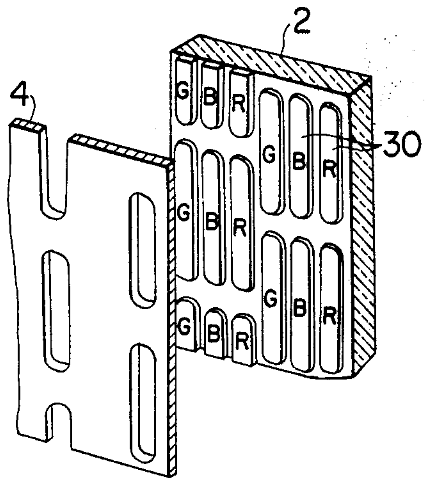
Figure 6:
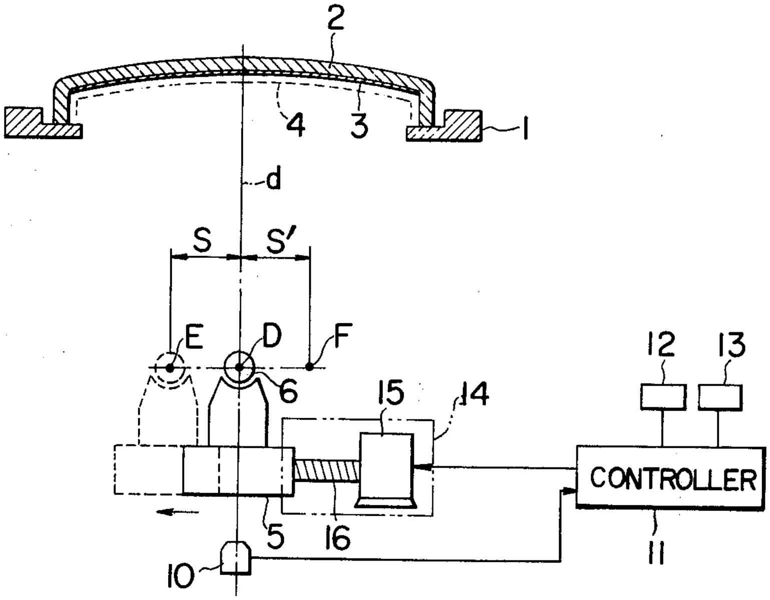

The above and other objects, features and advantages of the present invention will become more apparent from the following detailed description of the preferred embodiments of the invention when taken in conjunction with the accompanying drawings, in which;

FIG. 1 is a schematic diagram of a light exposing apparatus embodying the present invention, FIG. 2 shows a relationship between the distance of the movement of a light source in the apparatus shown in FIG. 1 and the dosing amount of light exposure, FIG. 3 is a perspective view schematically illustrating a relationship between the movement of the apparatus shown in FIG. 1 and a light exposure point, FIG. 4 shows the amount of light sensed on a light sensitive surface, FIG. 5 shows a perspective view illustrating a relationship between slots in a shadow mask and phosphor strips, and FIG. 6 is a schematic view illustrating a structure for transferring a light source to one of three deflection centers.

Figure 7:
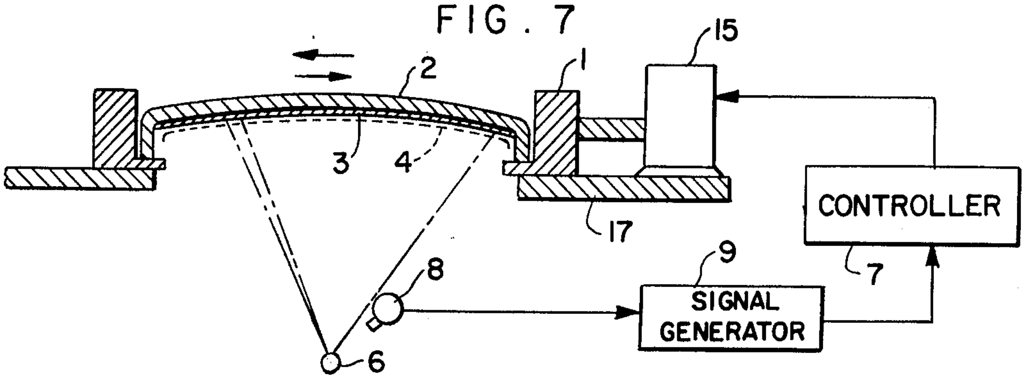

FIG. 7 is a schematic diagram of another embodiment of the present invention.

The light exposing apparatus of the present invention will now be described with reference to a preferred embodiment shown in the drawings.

Referring to FIG. 1, a face panel 2 fixed on a support 1 has a light sensitive film 3 including phosphor particles applied on an inner surface thereof, and has a slotted shadow mask 4 mounted in position thereon. An exposing light source 6 mounted on a movable platform 5 occupies a position at which a deflection center of a cathode ray tube is to be defined, and an ultraviolet light ray emitted therefrom passes through a well-known correcting lens system (not shown) and the slotted shadow mask 4 to the light sensitive film 3 to selectively expose the same. Since the movement of the movable platform 5 is controlled by a movement controller 7 as will be described below, the light source 6 is stepped by a fixed distance in one direction, i.e. lengthwise of the slots of the shadow mask, around the deflection center.

Stationarily mounted off a path of the exposing light to the light sensitive film 3 and at a position capable of being subjected to light emission from the light source 6 is a photo-electric converter 8 which continuously photo-electrically converts the amount of light received thereby and supplies the converted output to a signal generator 9, which has the function of accumulating an input signal and counting the accumulated value corresponding to the amount of light received. Each time the count reaches a predetermined value an electrical signal is supplied to the movement controller 7 and stepping motor 15 and the accumulated count is reset for initiating the next counting.

The movement of the movable platform 5 and the light source 6 by the movement controller 7 may be conducted by a program as shown in FIG. 2. The abscissa in the chart represents the dosing amount of light exposure and the ordinate represents the distance of the movement of the light source. During the movement control for the light source 6, each time an electrical signal is supplied to the movement controller 7 stepping motor 15 moves the movable platform 5 at a constant velocity by a distance *d*.

Thus, the light source 6 is intermittently stepped with respect to the light sensitive film 3 and the overall movement thereof is a flexible change to effectively cancel the change in the intensity of the light source 6 so that light exposure with an ideal distribution of the amount of light exposure is obtained independently of the change in the intensity of the light source. That is, the overall movement of the light source 6 is made a flexible change to effectively cancel changes in the distribution of the amount of the light source 6, said changes could be otherwise caused due to possible changes in the intensity of the light source 6, so that uniform distribution of the amount of light exposure is obtained independently of the intensity of the light source. During the stop period of the light source 6, the controller 7 operates to prevent the movement of the movable platform 5 until the electrical signals each emitted for each unit amount of light received reaches a predetermined count.

In the program shown in FIG. 2, the light source is kept stationary at the original position A and emits ultraviolet rays until a fifth electrical signal is issued, at which time it steps by a unit distance *d* at a constant velocity. At the occurence of a sixth signal it steps another unit distance at the constant velocity, and subsequently it steps progressively in the same manner. At the last position B, the light source remains in its stop state and emits ultraviolet rays while five electrical signals have issued.

Thus, by properly selecting the sequence and the timing of the stop and movement of the light source and presetting the program to a signal generator 9, a light exposing process of a desired light exposure distribution can be always attained.

FIG. 3 schematically shows a relationship between the movement of the light source 6 and the exposure point. The area *c* between the exposure point *a* created when the light source 6 is stopped at the position A and the exposure point *b* created when the light source 6 is at the point B is also exposed to a certain extent, as shown in FIG. 4, as the light source 6 is moved as described above.

Thus, by removing those areas other than the heavily exposed areas shown by hatched regions in FIG. 4 in the following developing process, it is possible to form a relatively elongated phosphor strip without reducing lengthwise spacing of the slot of the shadow mask.

While the light source was moved in the above example, it should be understood that the light source is fixed and the shadow mask and the light sensitive film may be moved, or both may be relatively moved. Furthermore, while the above example was described in connection with the exposure of the phosphor strip, it should be understood that the present invention may be equally applied in the manufacture of a phosphor screen of a so-called black matrix type color cathode ray tube as disclosed in U.S. Pat. No. 3,558,310 where PVA cured film strips serve as a tentative underlying layer during the formation of a matrix-shaped light absorbing film. In this case PVA rather than phosphor is incorporated in the light sensitive film.

Such phosphor strips are shown by the reference numeral 30 in FIG. 5. The phosphor strips 30 for three colors, i.e. green (G), blue (B) and red (R) are formed through three steps of the exposing process and the following developing process. Each time the respective one of the three exposing steps is conducted, the light source 6 is repositioned at one of the three deflection centers. When the PVA cured film is to be formed, the three steps of the light exposing process are sequentially carried out with the light source positioned at a respective one of the three deflection centers and then a single developing process is conducted.

In manufacturing a so-called in-line electron gun cathode ray tube in which three deflection centers are horizontally aligned, it is necessary to shift the light source 6 in the direction of a minor diameter of the slot of the shadow mask immediately before the three exposing processes. This will be explained in conjunction with FIG. 6, in which an original point detector 10 located on an axis *d* of the cathode ray tube, which has the switching function of a magneto-electric transducer, photo-electric transducer or the like, supplies an electrical signal to a controller 11 each time the light source 6 arrives at a first deflection center D on the axis of the tube. The controller 11 is connected with preset counters 12 and 13 each having times corresponding to the distances S and S', respectively, preset therein. Upon receiving said electrical signal the controller 11 continuously supplies a drive signal to a stepping motor 15 in the shifter 14 for a period corresponding to the distance S. The stepping motor 15 comprises a pulse motor which intermittently rotates equiangularly, and whose rotational power is transmitted to the movable platform 5 via a precision lead screw mechanism 16.

Assuming now that the light source 6 located at the third deflection center F is to be shifted to the left as viewed in the drawing by the shifter 14, the original point detector 10 supplies an electrical signal to the controller 11 when the light source 6 arrives at the original point, i.e. the first deflection center D, and the controller 11 causes the shifter 14 to stop the movement of the movable platform 5. The light source 6 is thus set to the first deflection center D where a first light exposing process as explained above is carried out.

When the light exposing process has been completed, the light source 6 again starts to move to the left as viewed in the drawing but this movement is limited to a predetermined period preset by the preset counter 12 and the light source 6 stops at a second deflection center, i.e. the position E, where a second light exposing process is carried out. Thereafter, the light source 6 goes back toward the position F. When the light source 6 arrives at the position D the original point detector 10 again supplies an electrical signal to the controller 11, and the shifter 14 shift the light source 6 by the distance S' under the control of the second preset counter 13. The light source 6 stops when it arrives at the third deflection center F. Where the distances S and S' are identical, a single preset counter need be used, and where more than two preset counters are used the original point detector 10 can be spaced from the axis *d* of the tube.

FIG. 7 illustrates an embodiment of the invention in which the support 1, face panel 2, light sensitive film 3 and slotted shadow mask 4 are translated along a base member 17 by a stepping motor 15. Stepping motor 15 is controlled by a controller 7 which receives an electrical signal from signal generator 9 each time the accumulated input signal from the photo-electric converter 8 reaches a predetermined level. Thus, in contrast to the embodiment of FIG. 1, the cathode ray tube structure is moved relative to a fixed light source 6.

What is claimed is:

1. In combination, a cathode ray tube comprising
- a face panel,
- a shadow mask having a plurality of slots therein, and
- a light sensitive film secured to the inner surface of said face panel between said face panel and said shadow mask, and a light exposing apparatus for selectively exposing said light sensitive film comprising
- an ultraviolet light source for exposing said light sensitive film to ultraviolet light through the slots in said shadow mask,
- movable platform means producing relative movement to the light source and said light sensitive film in a plane parallel to said film, means for receiving and converting part of said ultraviolet rays to corresponding first electrical signals, signal generator means for accumulating and counting said first electrical signals to generate a second electrical signal each time the accumulated first signals reach a predetermined value, and means for controlling said platform means to cause a stepwise relative movement of at least one of said light source and said light sensitive film in the direction of the length of the slots in said shadow mask, said movement being determined by said second electrical signal.

2. An apparatus according to claim 1, which further comprises means for keeping said platform means stationary at the beginning and ending points of said relative movement for a definite period longer than the period required for counting said predetermined value.

3. An apparatus according to claim 1, which further comprises second control means for causing relative movement of at least one of said light source and said light sensitive film in the direction of the minor diameter of said slots when said film is not exposed to said ultraviolet rays.

4. An apparatus according to claim 1, wherein said platform means supports and moves said light source relative to said light sensitive film.

* * * * *